US008135739B2

(12) United States Patent
Karidi et al.

(10) Patent No.: US 8,135,739 B2
(45) Date of Patent: Mar. 13, 2012

(54) ONLINE RELEVANCE ENGINE

(75) Inventors: Ron Karidi, Herzeliya (IL); Roy Varshavsky, Tel Aviv (IL); Noga Amit, Tel Aviv (IL); Oded Elyada, Tel Aviv (IL); Daniel Sitton, Tel Aviv (IL); Limor Lahiani, Tel Aviv (IL); Hen Fitoussi, Tel Aviv (IL); Eran Yariv, Zichron (IL); Benny Schlesinger, Ramat Hasharon (IL)

(73) Assignee: Microsoft Corporation, Redmond, WA (US)

( * ) Notice: Subject to any disclaimer, the term of this patent is extended or adjusted under 35 U.S.C. 154(b) by 429 days.

(21) Appl. No.: 12/344,812

(22) Filed: Dec. 29, 2008

(65) Prior Publication Data
US 2010/0169331 A1 Jul. 1, 2010

(51) Int. Cl.
G06F 17/30 (2006.01)
G06F 7/00 (2006.01)
(52) U.S. Cl. ........................................ 707/780; 707/755
(58) Field of Classification Search .................. 707/780, 707/755
See application file for complete search history.

(56) References Cited

U.S. PATENT DOCUMENTS

| 5,835,905 | A | 11/1998 | Pirolli | |
|---|---|---|---|---|
| 5,870,770 | A | 2/1999 | Wolfe | |
| 6,012,053 | A | 1/2000 | Pant | |
| 6,102,969 | A | 8/2000 | Christianson | |
| 6,510,406 | B1 | 1/2003 | Marchisio | |
| 6,665,837 | B1 | 12/2003 | Dean | |
| 6,990,628 | B1 | 1/2006 | Palmer | |
| 2004/0012625 | A1 | 1/2004 | Lei et al. | |
| 2008/0082506 | A1* | 4/2008 | Saito et al. | 707/3 |
| 2008/0294593 | A1* | 11/2008 | Kikuchi | 707/1 |
| 2009/0249244 | A1* | 10/2009 | Robinson et al. | 715/781 |

OTHER PUBLICATIONS

Linder, "Similpedia Finds Related Wikipedia Content," Aug. 13, 2007, http://www.downloadsquad.com/2007/08/13/similpedia-finds-related-wikipedia-content/.
Baeza-Yates, et al., "Web Page Ranking Using Link Attributes," Santiago, Chile, May 17-22, 2004, pp. 328-329.
Dhyani, et al., "A Survey of Web Metrics," Nanyang Technological University, ACM Computing Surveys, vol. 34, No. 4, Dec. 2002, pp. 469-503.

* cited by examiner

*Primary Examiner* — Kuen Lu
(74) *Attorney, Agent, or Firm* — Vierra Magen Marcus & DeNiro LLP

(57) ABSTRACT

Information is automatically located which is relevant to source content that a user is viewing on a user interface without requiring the user to perform an additional search or navigate links of the source content. The source content can be, e.g., a web page or a document from a word processing or email application. The relevant information can include images, videos, web pages, maps or other location-based information, people-based information and special services which aggregate different types of information. Related content is located by analyzing textual content, user behavior and connectivity relative to the source. The related content is scored for similarity to the source. Content which is sufficiently similar but not too similar is selected. Similar related content is grouped to select representative results. The selected content is filtering in multiple stages based on attribute priorities to avoid unnecessary processing of content which is filtered out an early stage.

17 Claims, 13 Drawing Sheets

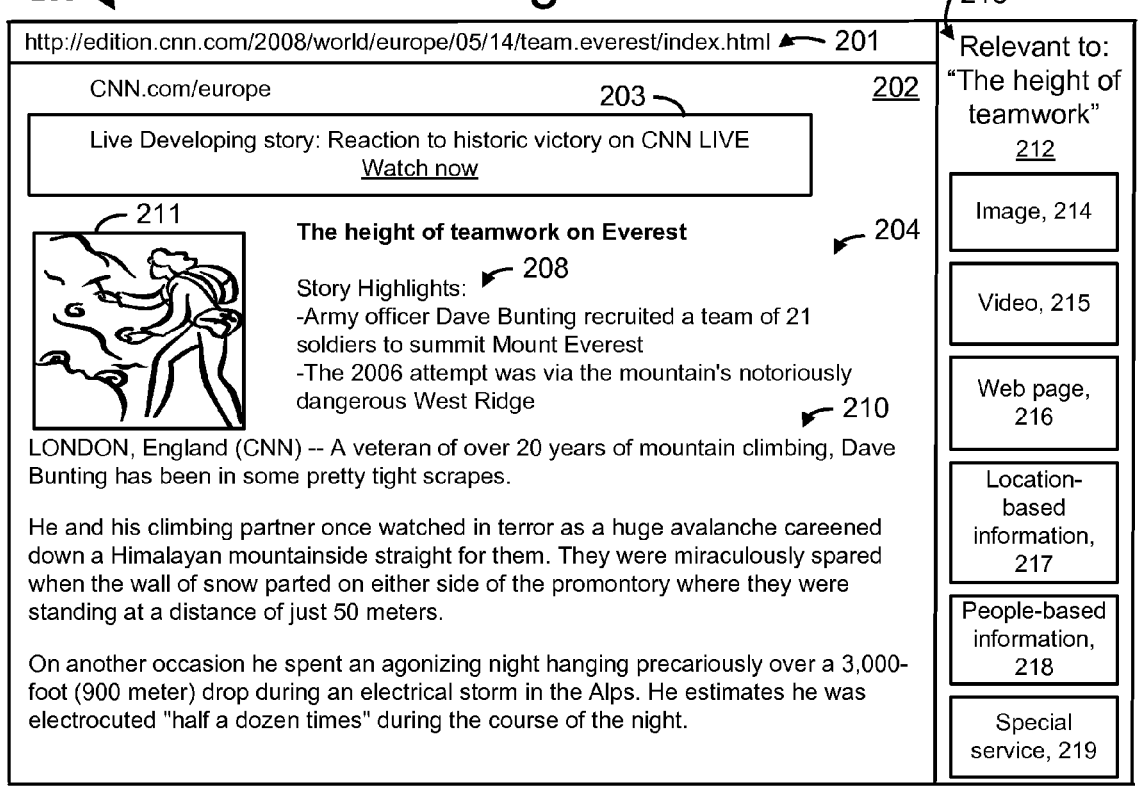
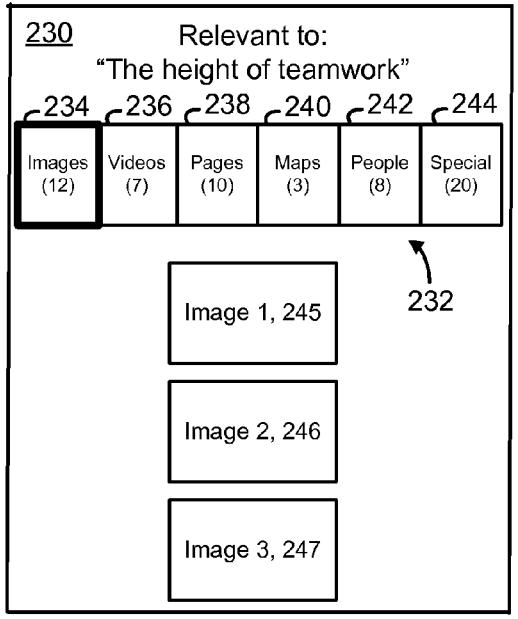
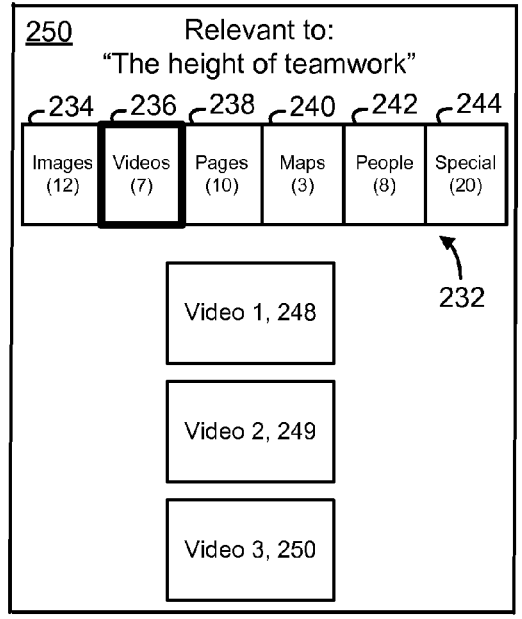

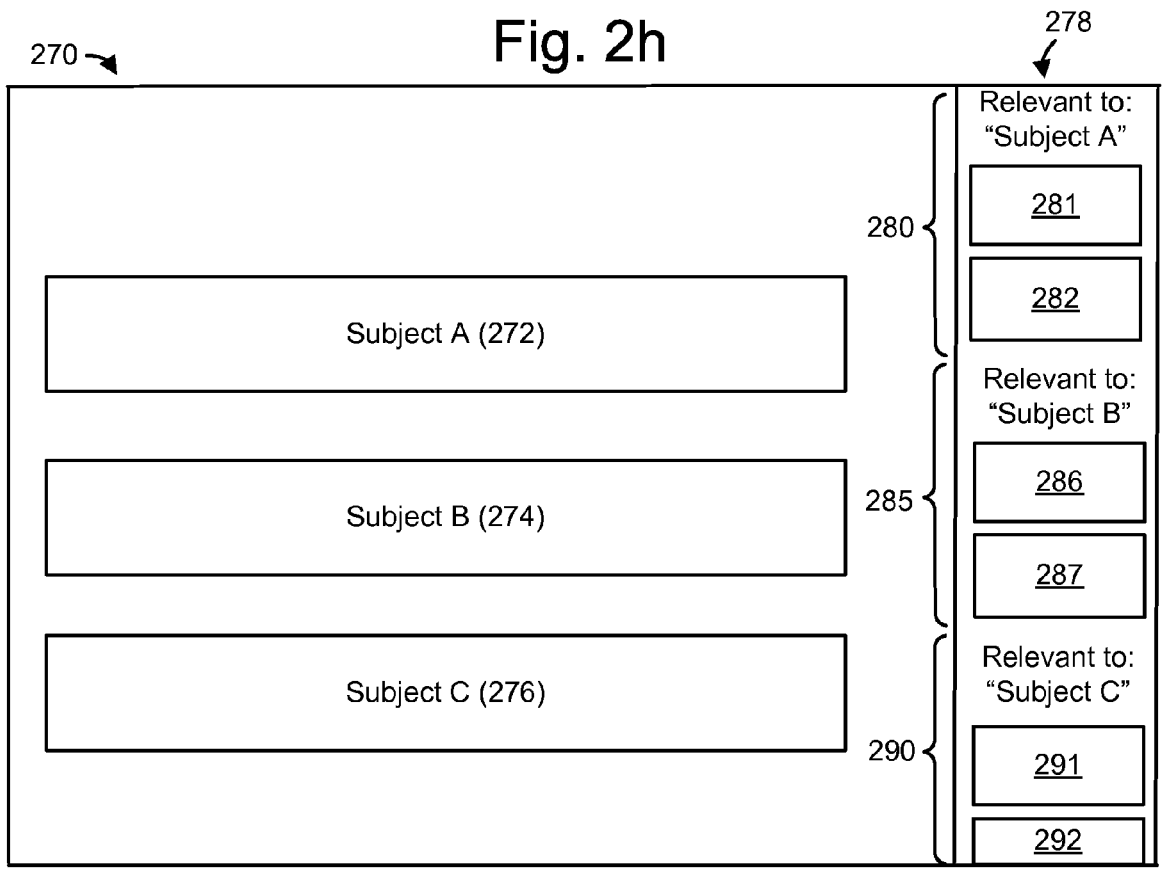

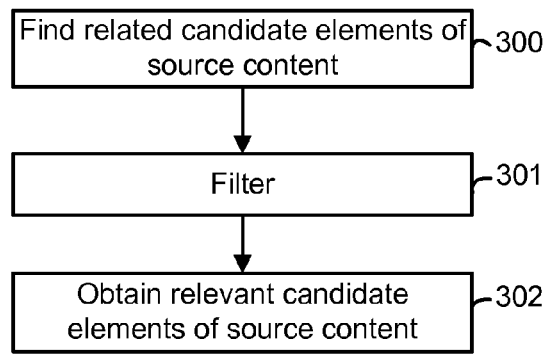
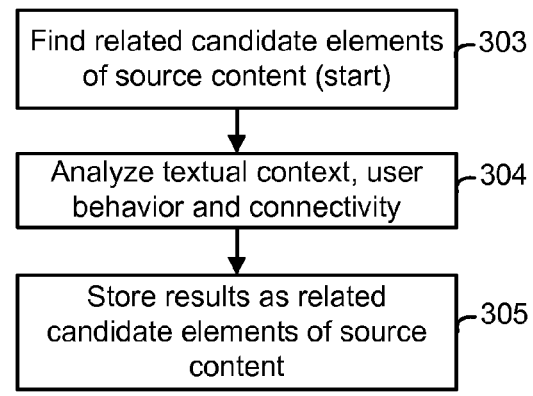
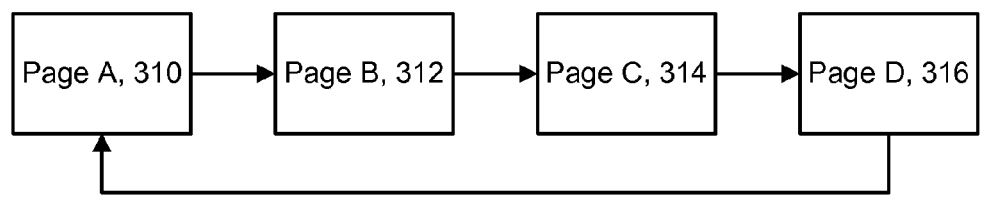
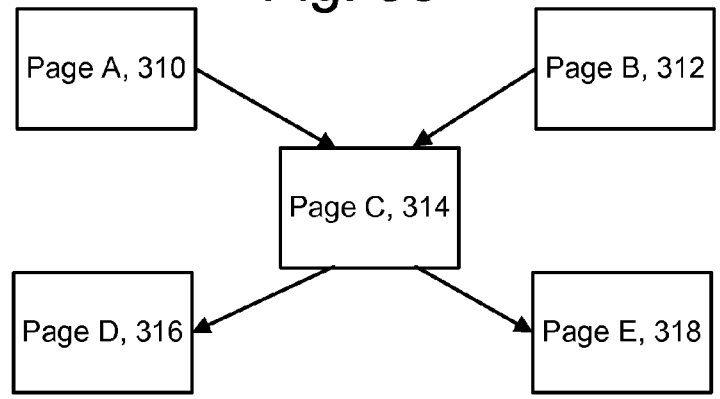

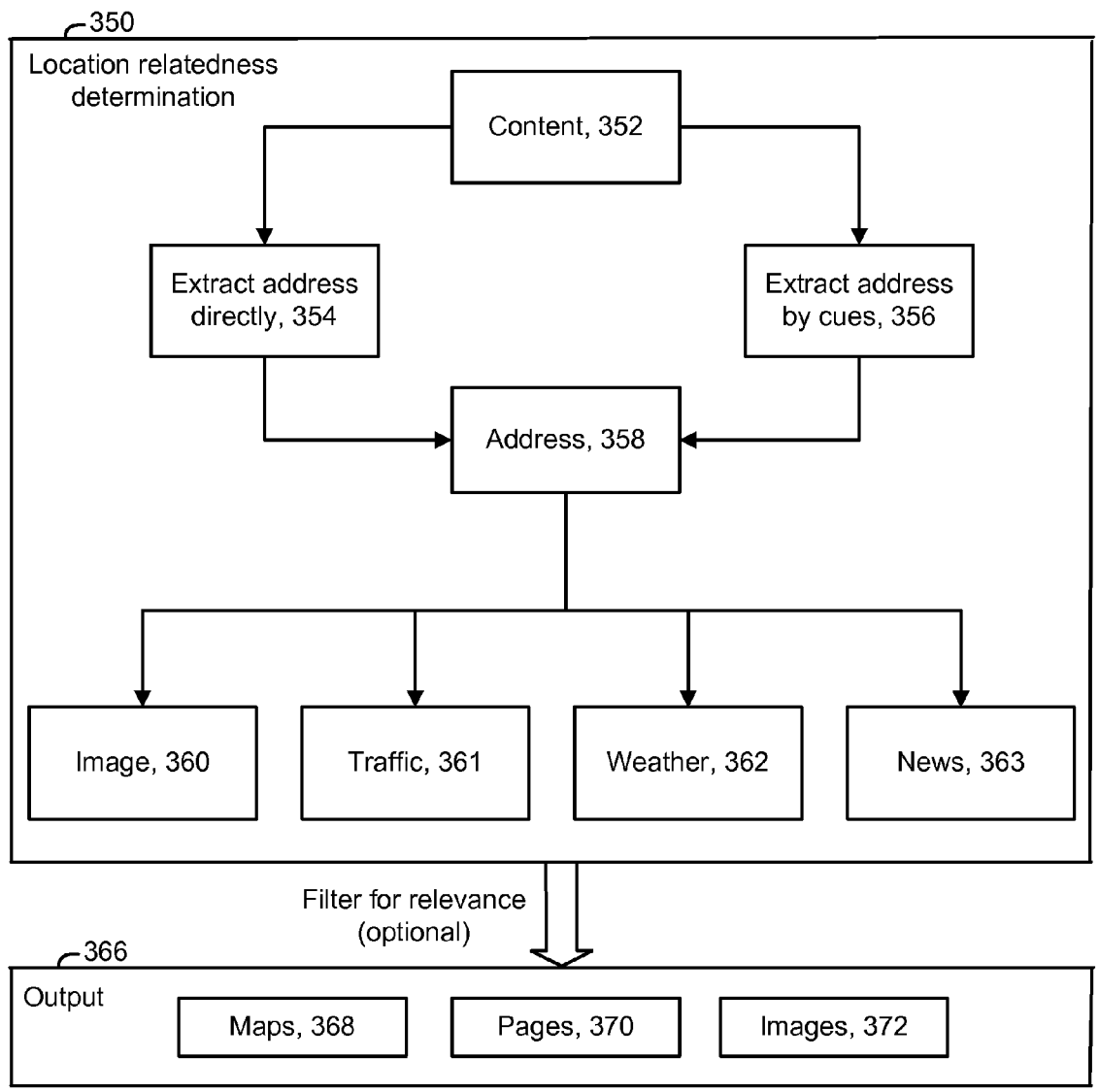

Fig. 4c

Candidate Element A

| Category | Score | Normalized score |
|---|---|---|
| Arts_&_Entertainment/Television | 0.259 | 0.235 |
| Arts_&_Entertainment/Radio | 0.229 | 0.207 |
| Society_&_Culture/Activism_&_Social_Issues | 0.219 | 0.198 |
| News/Wire_Services | 0.199 | 0.180 |
| Society_&_Culture/Politics | 0.198 | 0.179 |

Fig. 4d

Candidate Element B

| Category | Score | Normalized Score |
|---|---|---|
| Vehicles/Automobiles | 0.274 | 0.210 |
| News/Wire_Services | 0.268 | 0.206 |
| Arts_&_Entertainment/Television | 0.257 | 0.197 |
| Arts_&_Entertainment/Radio | 0.255 | 0.196 |
| News/Newspapers | 0.249 | 0.191 |

Fig. 4e

| A / B | Arts&Entertainment/Television | Arts&Entertainment/Radio | Society&Culture/Activism&Social_Issues | News/Wire_Services | Society&Culture/Politics | Dist(category, A) |
|---|---|---|---|---|---|---|
| Vehicles/Automobiles | 1 | 1 | 1 | 1 | 1 | 1 |
| News/Wire_Services | 1 | 1 | 1 | 0 | 1 | 0 |
| Arts&Entertainment/Television | 0 | 0.5 | 1 | 1 | 1 | 0 |
| Arts&Entertainment/Radio | 0.5 | 0 | 1 | 1 | 1 | 0 |
| News/Newspapers | 1 | 1 | 1 | 0.5 | 1 | 0.5 |
| Dist(category, B) | 0 | 0 | 1 | 0 | 1 | |

| Filter stage/attribute priority | Attribute |
|---|---|
| 1 | Attribute A |
| 2 | Attribute B |
| 3 | Attribute C |
| 4 | Attribute D |

ONLINE RELEVANCE ENGINE

BACKGROUND

Networks such as the Internet have become popular because they allow the user to access a virtually unlimited amount of information. Similarly, a user's local computing device also typically includes a large trove of information. However, as the amount of available content increases, it can be increasingly difficult for the user to locate content that is particularly relevant and interesting. For example, search engines require the user to enter open a new window or tab and formulate a phrase or question in order to obtain a list of results. If the results are not satisfactory, the user invests additional time and effort in refining the query. The user might give up and skip the entire process due to these difficulties. Moreover, such user-formulated searches are typically simplistic in that only a few quickly chosen words are provided by the user. This places the burden of locating information on the user.

When a user is viewing content such as a web page, the user can select hyperlinks to other web pages. However, the process of clicking through many links can be time confusing and disorienting as the user loses track of the original content which was viewed. Moreover, there is no guarantee that such a manually intensive process will even result in finding related content. Again, a significant burden is placed on the user and the experience is not optimized.

Techniques are need for optimizing a user's ability to access relevant and interesting content when interacting with a computing device.

SUMMARY

Techniques for displaying relevant content on a user interface are presented.

In one aspect, a computer-implemented method for providing content to a user via a user interface includes: (a) analyzing content which is displayed on the user interface, (b) based on the averaging, identifying a set of candidates elements which are related to the content, (c) filtering the candidate elements of the set to identify a subset of candidate elements of the set which are sufficiently similar, but not too similar, to the content, (d) grouping the candidate elements of the subset in groups, the candidate elements in each group are determined to be similar to one another, (e) selecting a representative candidate element from each group, and (f) displaying representations of the representative candidate elements on the user interface.

In another aspect, a computer-implemented method for providing content to a user via a user interface includes: (a) identifying attributes of content on the user interface, (b) based on the attributes, identifying candidates elements which are related to the content, (c) filtering the candidate elements in a multi-stage process, (d) where each stage of the multi-stage process includes evaluating each candidate element in the stage based on at least one of the attributes, and different attributes are associated with different stages and, based on the evaluating, providing a similarity score for each candidate element in the stage which indicates a similarity of each candidate element in the stage to the content, (d) where each stage of the multi-stage process includes, based on the similarity scores, classifying each candidate element in the stage to be kept or discarded, and (e) displaying representations of selected candidate elements which have been kept.

In another aspect, a computer readable media having computer readable software embodied thereon is provided for programming at least one processor to perform a method. The method includes: (a) parsing textual content on the user interface to determine keywords, (b) identifying a set of candidates elements which are related to the textual content, including performing a plurality of searches using the keywords, (c) identifying a subset of the candidate elements of the set which are sufficiently similar, but not too similar, to the textual content, (d) grouping the candidate elements of the subset in groups, the candidate elements in each group are similar to one another, (e) selecting a representative candidate element from each group, and (f) displaying representations of the representative candidate elements on the user interface concurrently with a representation of the textual content.

This summary is provided to introduce a selection of concepts in a simplified form that are further described below in the description. This summary is not intended to identify key features or essential features of the claimed subject matter, nor is it intended to be used to limit the scope of the claimed subject matter.

BRIEF DESCRIPTION OF THE DRAWINGS

FIG. 2a depicts an on-screen display which includes a source content region and a auxiliary region of relevant content.

FIG. 2b depicts an example auxiliary region of relevant image content.

FIG. 2c depicts an example auxiliary region of relevant video content.

FIG. 2h depicts an on-screen display which includes multiple subjects and multiple auxiliary regions of relevant content.

FIG. 3a depicts a process for identifying candidate elements which are relevant to source content.

FIG. 3b depicts a process for identifying candidate elements which are related to source content.

FIG. 3d depicts connectivity through a shared path.

FIG. 3e depicts connectivity through shared incoming and outgoing links.

FIG. 3f depicts a flow diagram for identifying location-based candidate elements which are related to source content.

FIG. 4c depicts scoring of a first element based on different categories.

FIG. 4d depicts scoring of a second element based on different categories.

FIG. 4e depicts similarity scores between the categories of FIGS. 4c and 4d.

DETAILED DESCRIPTION

Techniques for displaying relevant content on a user interface are presented.

Source content, or content which a user is currently accessing on a user interface, is analyzed to automatically locate additional relevant content, and to present the additional relevant information to the user such as by an on-screen auxiliary display. As the user accesses different source content, different relevant content is located and displayed. The content which the user is currently accessing, e.g., the source content, can include content which is obtained via a network and/or via the user's local computing device. The local computing device can be a desktop computer, laptop, web-enabled cell phone, personal digital assistant (PDA), palm top computer or the like. The additional relevant content can include images, audio, videos, pages such as web pages or other document pages, location-based content such as maps of locations named in the source content, people-based content such as references to people named in the source content, company-based content such as references to company/industry named in the source content and special services which aggregate different types of content such as movies, restaurants, stocks and so forth.

Candidate elements which may be related to the source content are first located using, e.g., an analysis of textual context of the source content, behavior of users relating to the source content and/or connectivity of the source content to other content. The candidate elements can then be subject to an efficient multi-stage filtering process which scores the relevance of different attributes of the candidate elements to the source content. Priorities are assigned to the attributes so that filtering is performed on high priority attributes before low priority attributes. Scoring occurs incrementally for each stage on as needed basis so that candidate elements which have been discarded in an earlier stage are not scored in subsequent stages, resulting in savings in processing resources.

Figure 1:
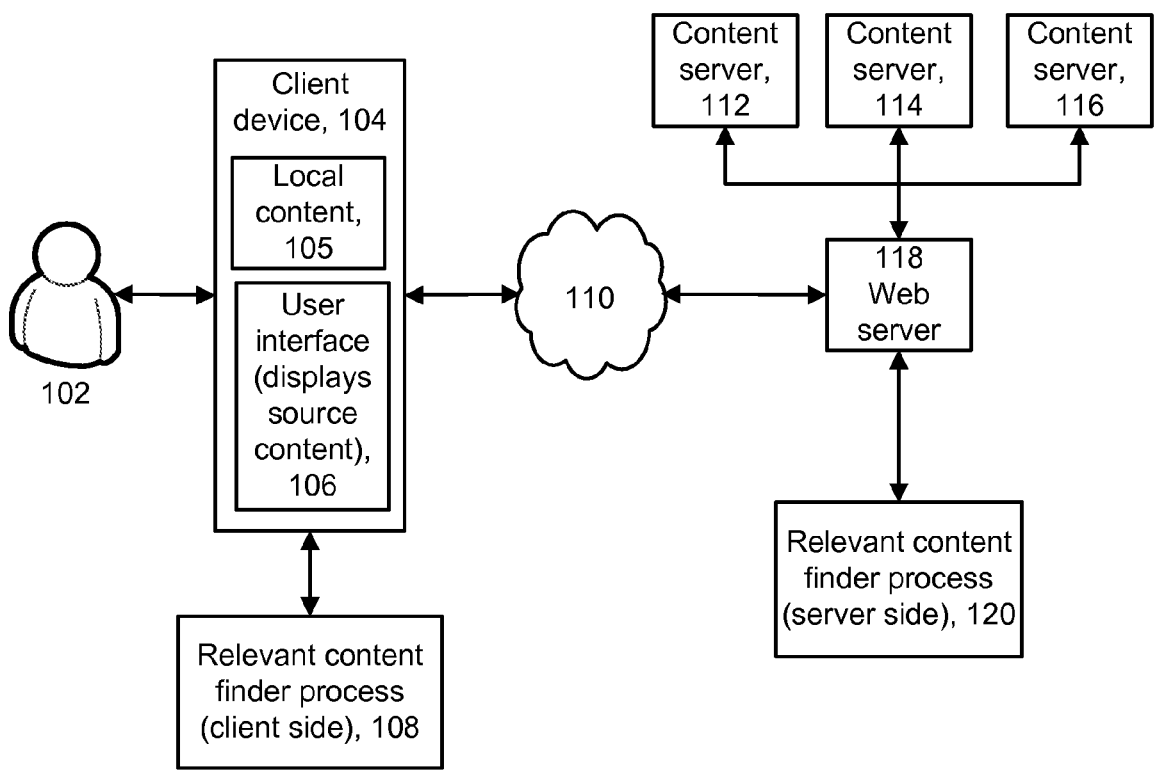
FIG. 1 depicts an overview of a system in which relevant content is provided on a user interface.

FIG. 1 depicts an overview of a system in which relevant content is provided on a user interface. The system includes a client computing device 104 which is accessed by a user 102 via a user interface 106. The user interface 106 can include a display screen for visual output and a speaker for audio output. An input device such as a keyboard, voice interface, touch screen and/or a mouse, touchpad or other pointing device can be provided to receive user commands. The client device 104 may include local content 105 which can be accessed by the user. For example, this can include files which are stored locally on a non-volatile memory such as a disk drive, solid state memory or other storage device of the client device 104. The files may be organized by a directory system, for instance. Note that content which is obtained via a network is also stored locally at the client device, at least temporarily, in a memory such as RAM. A relevant content finder process may operate at the client side (108) and/or at a server side (120) to provide the functionality as described herein.

The client device 104 may connect to network resources via a network medium or cloud 110, such as a local area network (LAN) or wide area network (WAN) such as the Internet. For example, the client device 104 may connect to a web server 118 which, in turn, can access content at different locations, such as content servers 112, 114 and 116. Further details of computer hardware which may be used, e.g., for the client device 104 are provided in FIG. 6.

FIG. 2a depicts an on-screen display which includes a source content region and an auxiliary region of relevant content. As an example, the source content is a web page 200 which is user is viewing. The user may arrive at the web page in different ways, such as by performing a search, visiting a bookmarked web site, or receiving a link to the web page from a friend via email. The web page 200 includes a URL 201, a primary region 202 and an auxiliary region 212 which provides information which is relevant to the primary region. The primary region 202 includes a first subject 203 which invites the user to learn more about a developing story, and a second subject 204 which has a title 206: "The height of teamwork on Everest." For the second subject 204, a highlights section 208 is provided along with a main body 210 and an image 211. The particular layout shown is an example only as many variations are possible. For example, the auxiliary region 212 is provided as a sidebar on the right hand side of the primary region 202 but can be in any location relative to the primary region, including within the primary region, and/or at more than one location. Also, the auxiliary region can be provided in a different window than the primary region, and/or on a different display screen such as in a multi-screen setup. The second subject 204 relates to an adventurous story of mountain climbers. Two subjects are depicted as an example only as one or more subjects may be provided as discussed further in connection with FIG. 2h.

The auxiliary region 212 includes a caption 213 which indicates that it is relevant to the article "The height of teamwork." The caption 213 is abbreviated to fit into the available screen space. Examples of relevant information include an image 214, a video 215, a web page 216, location-based information 217, people-based information 218 and a special service 219. The user can select any of the relevant information to access the information in another window, in a mouse over popup format, or using other display techniques. The relevant information can be accessed via a hyperlink, for instance, and/or saved to a favorites folder or the like for later access.

A relevant image 214 may be an image of Mt. Everest, or an image involving mountain climbing, for instance. The image can be in any format such as JPEG, TIFF, GIF and so forth. A relevant video 215 could also relate to mountain climbing generally or at Mt. Everest, specifically. Example video file formats include MP3 and MPEG-4. A relevant web page 216 might be related to the history of Mt. Everest. Relevant location-based information 217 might include a map of the Nepal and Tibet region where the mountain is located, or perhaps a satellite image of the mountain. Relevant people-based information 219 might include a web page which provides more information on "Dave Bunting," one of the people mentioned in the second subject 204. A relevant special service 219 might include a link to a web page of a movie which relates to outdoor adventures. Special services can include information which does not fit into the other categories.

Regarding images, these can be obtained by extracting all the images in linked pages of degree 1 (or 2), with simple filtering of small images, odd-size images, by image file name and alt-text tags. We can enrich this approach by applying techniques mentioned next in connection with related web pages, and extracting images from those pages.

Regarding web pages or any other textual content such as documents of word processing applications, emails, and so forth, extraction methods can be used to obtain a title and HTML keywords, run a real time search with these keywords, and heuristically filter the results. The search can be enriched by using variations of the keywords. Another extension is adding specific keywords for vertically arranged special services. Examples of word processing applications are MICROSOFT WORD® AND POWERPOINT®. Similarly, an email is a document in an email application which includes text which can be parsed. Examples of email applications include MICROSOFT OUTLOOK®. For instance, a user may open an email that is from a company that is selling a product. The relevant content in such as case could provide information about the company or the product, such as background information of the company, how long the company has been in business, user reviews of the product, where to buy the product, a contact person of the company and so forth. It may also possible be determine that a user is looking at a product page or a certain product, in which case corresponding relevant information can be located. Note that the relevant information can be provided from an objective third party so that it is more objective valuable to the user than sales material.

Regarding location-based information, when one or more locations, e.g., a place (such as Times Square, Disneyland, Pacific Ocean), a street, city, county, state, or country, appear in the primary region 202, the relevant information may provide, e.g., maps, nearby businesses and attractions, local news, weather and traffic. When more than one location is identified, multiple locations which are close together may be depicted on the same map (using push-pins, for instance) or, when the locations are not close to each other, several clusters may be provided, one cluster per map. This can be enriched with other location-based services, such as weather and traffic.

Regarding people-based information, when one or more person's names appear in the primary region 202, relevant information may be provided using name lookup directories, social networking sites such as MICROSOFT WINDOWS LIVE®, LINKEDIN® and FACEBOOK®, reference sites such as WIKIPEDIA®, and information, if available, from the user's contacts (e.g., a record of people known to the user and information such as images, phone numbers, email addresses, and web pages).

Special services can be a catchall category for elements for which separate categories are not desired. The special services may be vertically arranged, meaning that they are combined in one category. Such services might be too numerous to place in separate categories and are therefore aggregated together. Dedicating a separate category for each service might not be a scalable approach. Moreover, we expect these services to not be applicable simultaneously. Examples of such special services include, e.g., company related services, such as stock reports, offices deployments, focal persons (managerial staff), and breaking news, movie related services such as movie reviews, actors, and online access to tickets, sports related services such as team roster, tables and schedule, and online access to tickets and merchandise, restaurant related services such as reviews and menus, product related services such as consumer reviews of products and manufacturer information, and so forth.

In FIG. 2a, the depiction of a web page is an example as, more generally, any information that the user is accessing can be enhanced by locating and presenting relevant information. Essentially, the context of the user's interaction with a computing device is determined and information which is relevant to the current context is located and presented, either automatically, without additional user input, or in response to a user command. The user is thus provided with a preview of relevant information that is discovered implicitly. Further, the relevant information can be updated as the context changes, such as when the user navigates to another web page or window. The information that the user is accessing can be obtained via a network, such as when the user employs a browser to access web pages and multimedia content from the Internet, or from a local storage device of the computing device, such as when the user accesses documents stored on a hard drive. A user may access a word processing document, email or any other textual content, for instance, which can be analyzed to determine relevant information. For example, the second subject 204 could be provided in a word processing document in which case the relevant information can be the same or similar as when the second subject 204 is in the web page 200. The relevant information can include other word processing documents as well as web documents. For the web page 200, the relevant information can include other web documents as well as word processing documents.

The auxiliary region 212 depicts one element from each of six different categories. In practice, any number of elements in different categories can be provided. Various user interface techniques such as scroll bars and tabs can be used to allow the user to navigate the relevant information. An example involving tabs is discussed next.

FIG. 2b depicts an example auxiliary region of relevant image content. The auxiliary region 230 includes a set of tabs 232, including tabs for images 234, videos 236, pages 238, maps or other location-based information 240, people 242 and special services 244. The specific layout provided is not necessarily to scale or in proportion to the web page 200 but allows the relevant detail to be seen. Each tab represents a category of elements which are relevant to the web page 200, and the number of elements in each category is indicated in parentheses. For example, there are (12) images, (7) videos, (10) pages, (3) maps, (8) people and (20) special services. In this depiction, the images tab 234 is selected by the user so that example images 245, 246 and 247 are provided. Additional images may be viewed by the user activating a slider widget, for instance.

FIG. 2c depicts an example auxiliary region of relevant video content. In this depiction, the videos tab 236 is selected by the user so that example videos 248, 249 and 250 are provided.

Figure 2D:
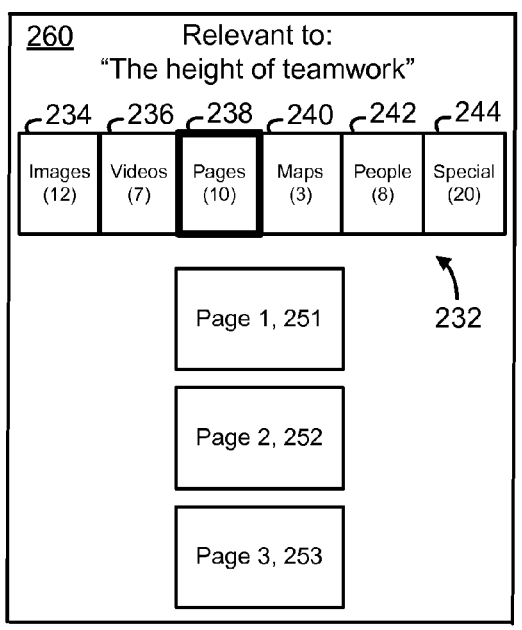
FIG. 2d depicts an example auxiliary region of relevant page content.

FIG. 2d depicts an example auxiliary region of relevant page content. In this depiction, the pages tab 238 is selected by the user so that example pages 251, 252 and 253 are provided.

Figure 2E:
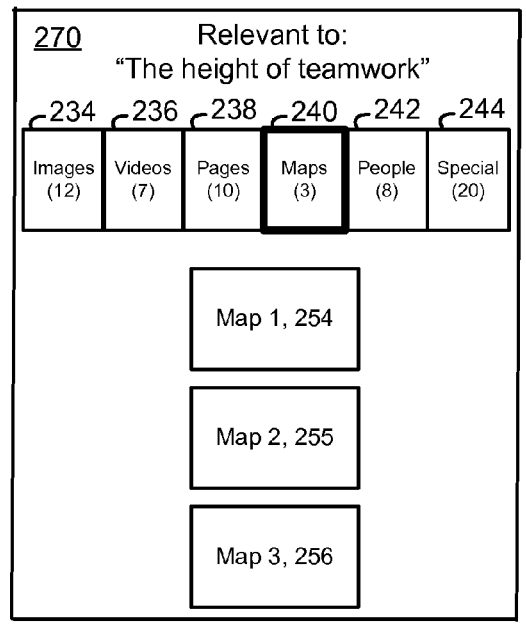
FIG. 2e depicts an example auxiliary region of relevant map content.

FIG. 2e depicts an example auxiliary region of relevant map content. In this depiction, the maps tab 240 is selected by the user so that example maps 254, 255 and 256 are provided.

Figure 2F:
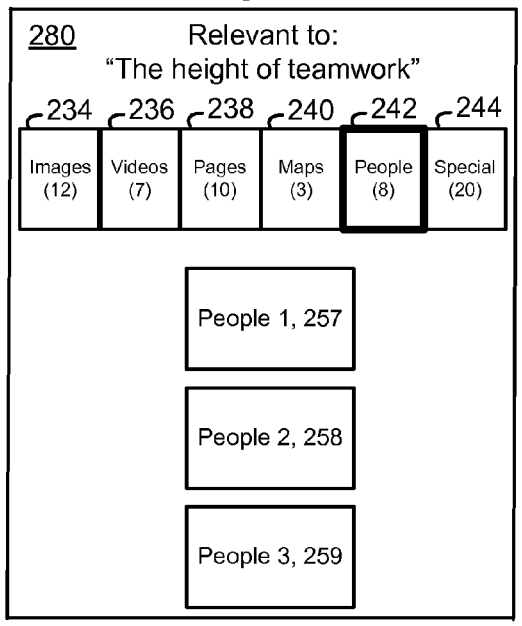
FIG. 2f depicts an example auxiliary region of relevant people content.

FIG. 2f depicts an example auxiliary region of relevant people content. In this depiction, the people tab 242 is selected by the user so that elements of example people 257, 258 and 259 are provided.

Figure 2G:
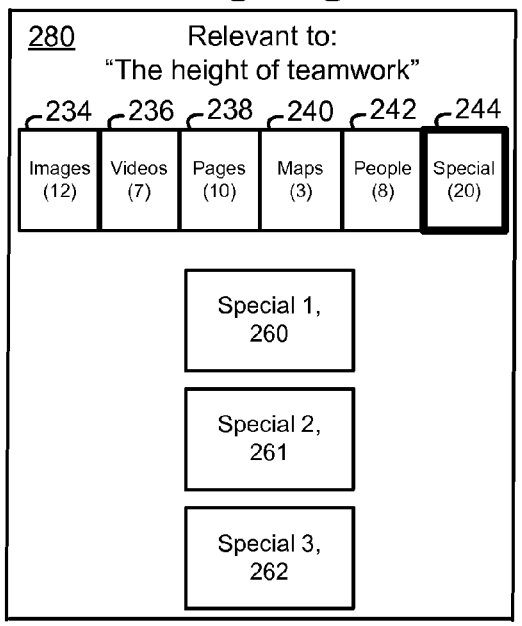
FIG. 2g depicts an example auxiliary region of relevant special services content.

FIG. 2g depicts an example auxiliary region of relevant special services content. In this depiction, the special services tab 244 is selected by the user so that example special services 260, 261 and 262 are provided.

FIG. 2h depicts an on-screen display which includes multiple subjects and multiple auxiliary regions of relevant content. In the example of FIG. 2a, the auxiliary region 212 provides relevant information for one subject in the primary region 202. It is also possible to provide separate auxiliary regions for different subjects in one or more primary regions.

For example, in FIG. 2h, in a web page or other document 270, subjects 272, 274 and 276 are provided. In an auxiliary region area 278, a first auxiliary region 280 is relevant to subject A (272), and includes elements 281 and 282 and additional elements which can be viewed by scrolling down, for instance. A second auxiliary region 285 is relevant to subject B (274), and includes elements 286 and 287 and additional elements. A third auxiliary region 290 is relevant to subject C (276), and includes elements 291 and 292 and additional elements. Many other variations are possible for presenting relevant information of different subjects. Further, when there are multiple subjects on a page, it is not necessary to provide auxiliary information for all subjects. Instead, the auxiliary information can be provided for selected subjects which are deemed more important, e.g., based on their position in the page (subject at the top is more important than subject at the bottom), size and type of font (larger or bold font is more important than smaller and non-bold font), page structure (e.g., header and title fields more important than body fields) and so forth. We can thus identify that the user is viewing different subjects concurrently. It is also possible for the user to provide an input to ask for relevant information of a selected subject, in which case relevant information for only that subject is located.

Figure 3C:
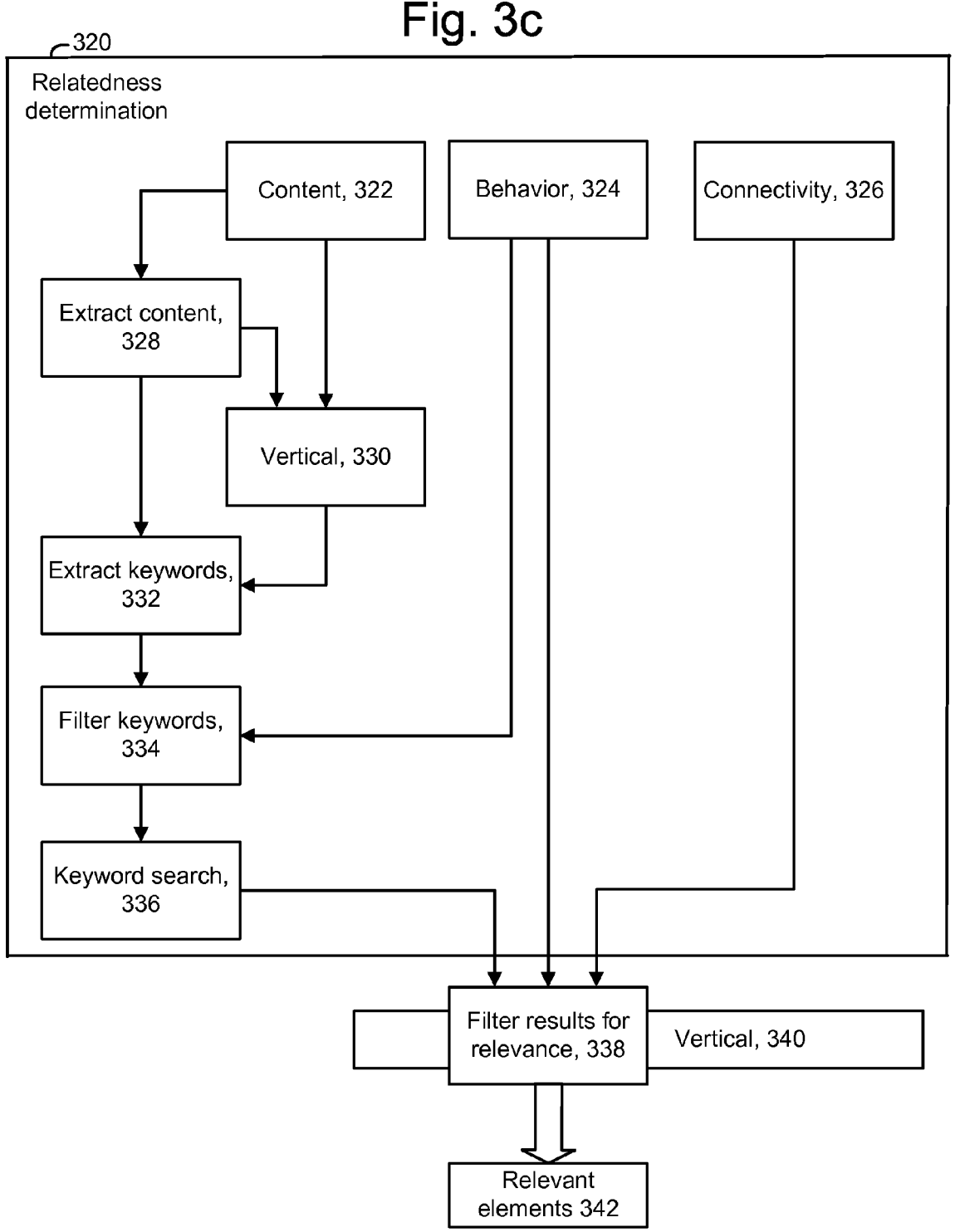
FIG. 3c depicts a flow diagram for identifying candidate elements which are related to source content.

FIG. 3a depicts a process for identifying candidate elements which are relevant to source content. At a high level, the process includes finding related candidate elements of source content (step 300), and performing filtering (301) to obtain relevant candidate elements of the source (step 302). The relevant candidate elements are essentially the most relevant of the related candidate elements and are thus a subset of the set of all candidate elements. Further details of step 300 are provided particularly in connection with FIGS. 3b-3f, and further details of steps 301 and 302 are provided particularly in connection with FIGS. 4a-5g.

FIG. 3b depicts a process for identifying candidate elements which are related to source content. In FIG. 2a, the second subject 204 is an example of source content. An example process for finding the relevant image, video, page, map, people, location or special services elements can include first identifying related candidate elements of the source content, starting at step 303. Step 304 indicates that this can include one or more of analyzing a textual content of the source content, analyzing user behavior in regard to the source and analyzing connectivity of the source content. The flow of these strategies is in parallel. Step 305 includes storing results of the analyses as related candidate elements of the source. Further details of step 304 are provided in connection with FIG. 3c-3e.

FIG. 3c depicts a flow diagram for identifying candidate elements which are related to source content. A relatedness determination depicted in box 320 includes three main strategies: content 322, behavior 324 and connectivity 326. Generally, two web pages or other elements are related if similar/related content appears in both. Candidate elements that are related by content to the source page share similar textual properties with the source content. Similar titles, descriptions, or important parts of a page can contribute to the similarity measurement. One way to find candidates similar to the source content is based on keyword and category based searching. The keywords can serve as seeds for the search and are extracted from the source content, and manipulated so that the pool of candidate elements will be as diverse as possible.

The source content which the user is currently viewing can be analyzed to find related content. Different attributes can be extracted from the source content, such as normalized page keywords and normalized page categories, and compound search queries can be formed according to different strategies. These strategies can include using page and keyword categories as search terms, using related words (such as single/plural forms, inflections etc.), using subsets of the original keywords (with negation on the others, using the Boolean NOT or ! command), and putting emphasis on highly weighted keywords. A keyword may have a higher weight, e.g., when it is used relatively frequently in a document, if it is emphasized in a larger or bold font, or if it is close to the top of the page. Also, a keyword may have a higher weight if it is unique to the specific context (e.g., a 'rare' word that appears many times, in 'high profile'). These manipulations result in more relevant content than a naïve keyword search.

As a specific example, we can use subset of keywords, motivated by the aim to receive relevant but not identical results. For example, for a keyword set of (a, b, c, e, f) with a size of 5, we search for:
 (a and b and c and e and f) or
 (!a and b and c and e and f) or
 (a and !b and c and e and f) or
 (a and b and !c and e and f).
Using URL/keyword categories
Since we can have information about both URL category and the keywords, we can build the following query:
 (a and b and c and e and f and category(URL)) or
 (category(a) and b and c and e and f) or
 (a and category(b) and c and e and f) or
 (a and b and category(c) and e and f)
Using related words
For example, if a' and a" are synonyms of a, then the search query can look like:
 (a or a' or a") and (b) and (c or c')
Search: in order to expand the candidates' pool, several search calls are emitted, each with a small variation of the original call. For instance, assuming the keywords are "Bill Clinton", "Barack Obama" and "George Bush", search queries can be:
 (a) "Bill Clinton" and "Barack Obama" and "George Bush"→standard
 (b) !"Bill Clinton" and "Barack Obama" and "George Bush"→all but the first
 (c) "Bill Clinton" and !"Barack Obama" and "George Bush"→all but the second
 (d) "Bill Clinton" and "Barack Obama" and !"George Bush"→all but the third
The motivation behind varying the queries is to expand the search and explore similar, yet not identical candidates. An improvement to the heuristic, suggested above, can be considering synonyms, single/plural forms, inflections etc.

Category-Based Search

Category-based search routine resembles the keywords-based search, by utilizing the extracted-then normalized-then filtered keywords, but rather varying the keywords in a query the variation is done on the category of the keyword.

Keywords extraction, normalization and filtering: see above.

Category: Keywords have a taxonomy that arranges them. A keyword category is extracted from a k-shortest path (KSP) module, and then can be added to the query pool (using the same example):
 (a) Category of ("Bill Clinton") and "Barack Obama" and "George Bush"
 (b) "Bill Clinton" and Category of ("Barack Obama") and "George Bush"
 (c) "Bill Clinton" and "Barack Obama" and Category of ("George Bush")
 (d) Page category Referring still to FIG. 3c, one way to determine related candidate elements is to first extract content of the source (box 328), such as by parsing the HTML code of a source web page, or parsing the text in a source word processing document or email. At box 332, significant keywords are extracted from the source content. This can include obtaining keywords from the title, meta-data, tags, headers, captions and important sentences such as the first sentence in the source content. Box 330 indicates that the source content may be associated with one or more vertically organized special services (e.g., finance, news, sport, shopping, leisure, blogs, technology, dining, learning and other services which are aggregated into one category but are generally unrelated). This association may be relevant in several stages.

At box 334, a number k of the most significant keywords of the source content are filtered, and a keyword search is performed at box 336, e.g., using a search engine. That is, a search process is called with the keywords. The output of the keyword search 336 is provided as a result to a box 338 which involves filtering the results for relevance. Again, the vertical organization of the results as depicted by box 340 can be considered during the filtering. For example, web sites that are known to be less relevant in one vertical (e.g., finance) may be filtered, while sites that have a good reputation, may be preferred. Box 338 can also receive inputs from a box 324 which related to user behavior associated with the source content, and a box 326 which relates to connectivity of the source content to other elements.

Regarding behavior (box 324), two elements are related if a significant group of users considers them as being related. This can be determined, e.g., through search and navigation/popularity aspects. The search aspect determines how most people reach and find the current element. This can involve a reverse lookup. For instance, keywords that people use to find the current page can be extracted and fed to a search engine to obtain similar elements. The keywords found from the behavior analysis are provided to box 334 for filtering with the keywords from the content analysis to select the top k related elements.

The navigation/popularity aspect of the behavior analysis determines where people go before/after visiting the source content. One way to determine this is by tracking the navigation of the users. Collecting this statistic may be supported by the users' client devices. By doing this, we can learn and measure the surfing patterns of users, and suggest a number k1 of next elements and a number k2 of previous elements as being related to the source content. The results of the analysis provide candidate elements to the filter box 338 to be filtered with candidate elements from the content analysis 322 and the connectivity analysis 326.

Regarding connectivity (box 326), a set of elements such as pages on the web or files in a computer directory can be represented by a directed graph in which the nodes are the pages and the edges are the links connecting the pages. Pages that are either adjacent or share some properties in the graph can be considered to be connected. Candidate elements may be considered to be related to the source content based on various factors.

One possible factor for analyzing connectivity is whether there is a significant path between elements. For example, in FIG. 3d, page A (310), page B (312), page C (314) and page D (316) may all be considered to be related. The arrows depict how each element can be reached from another element. Thus, page B can be reached from page A, page C can be reached from page B, page D can be reached from page C and page A can be reached from page D. For a web page, for instance, a user reaches a second web page by clicking on a hyperlink in a first web page. Thus, a path can be defined as a chain of links between pages. The significance of a path can be based on principles such as: (a) preference for a direct path (e.g., page A is more likely to have a significant path to page B if page B is only one link away from page A), (b) preference for a two way path (e.g., page A is more likely to have a significant path to page B if there is a path from page A to page B, and a path from page B to page A), and (c) preference for a cluster of elements.

Another possible factor for connectivity is whether elements both share incoming or outgoing links. For example, in FIG. 3e, page A (310) and page B (312) are related because they share outgoing links to page C (314), and page D (316) and page E (318) are related because they share incoming links from page C (314).

Referring again to FIG. 3c, an example implementation for the connectivity analysis (box 326) of the relatedness determination can include a map step of finding the outgoing and incoming links of a page or other element, and recursively repeat this process k1 times for the new pages which are found by the outgoing link and k2 times for the new pages which are found by the incoming links. The candidate elements are then ranked according to their distance (e.g., number of links away) from the source content. Clusters of elements can be identified and the elements which share the same cluster can be prioritized. For example, from all $N_i$ elements in cluster $C_i$ the element with the highest score (i.e., most similar to the context/source) is preferred. The elements which result from the connectivity analysis can then be provided to the relevance filter 338 for filtering with the other candidate elements.

The relevance filter 338 thus can receive related candidate elements of a source element which are found by content, behavior and/or connectivity analyses and performing a filtering process to obtain the k most relevant elements (box 342) as an output to present to the user.

Thus, the different strategies can be integrated. For related elements such as images/pages, two of them may share the main flow, nevertheless, filtering (both of keywords, and of results), ranking and weighting of the results from all sources may vary. Regarding keyword generation and ranking, as mentioned, keywords may be added according to the vertically arranged special services (e.g., adding "restaurant or recipe" to the keyword "dining"). At the results filtering box 338, a preference for results from the same vertical may be implemented.

FIG. 3f depicts a flow diagram for identifying location-based candidate elements which are related to source content. A location relatedness determination is depicted in box 350. As mentioned previously, maps and other location-based information can be relevant to source content 352 which a user is currently accessing. One approach (box 354) involves extracting locations directly from the source content. The locations can be identified by a name of a place (such as Times Square, Disneyland, Pacific Ocean), a street, city, county, state, or country or the like. A second approach (box 356) involves extracting an address from cues in the source content. This can include extracting cues such as a phone number or business name and accessing a phone number-to-address directory or a business name-to-address directory, respectively. Once an address is found (box 358), it can be used in a number of ways to provide location-based content to a user. For example, an image (box 360) can be provided, such as a street map, topographical map, satellite image, or street level image. Traffic data (box 361) can also be obtained and provided either with the image data, such as by providing color coding of roads in a map, or separately, such as in a list of traffic problems in a location. Weather data (box 362) can be obtained as can local news (box 363). Various other location-related content such as area attractions can be provided.

The location-based content can optionally be filtered for relevance. Outputs 366 include maps 368, pages 370 and images 372. For example, if the source content is a web page for a travel site, location-based content such as area attractions and weather may be more relevant than traffic and news. The location-based content can similarly be filtered for relevance with the content, behavior and connectivity based results of FIG. 3c.

It was discussed above that various techniques can be used to identify candidate elements which are related to source content which a user is accessing. Further details of a filtering process to determine which of the related candidate elements are most relevant are provided next.

Figure 4A:
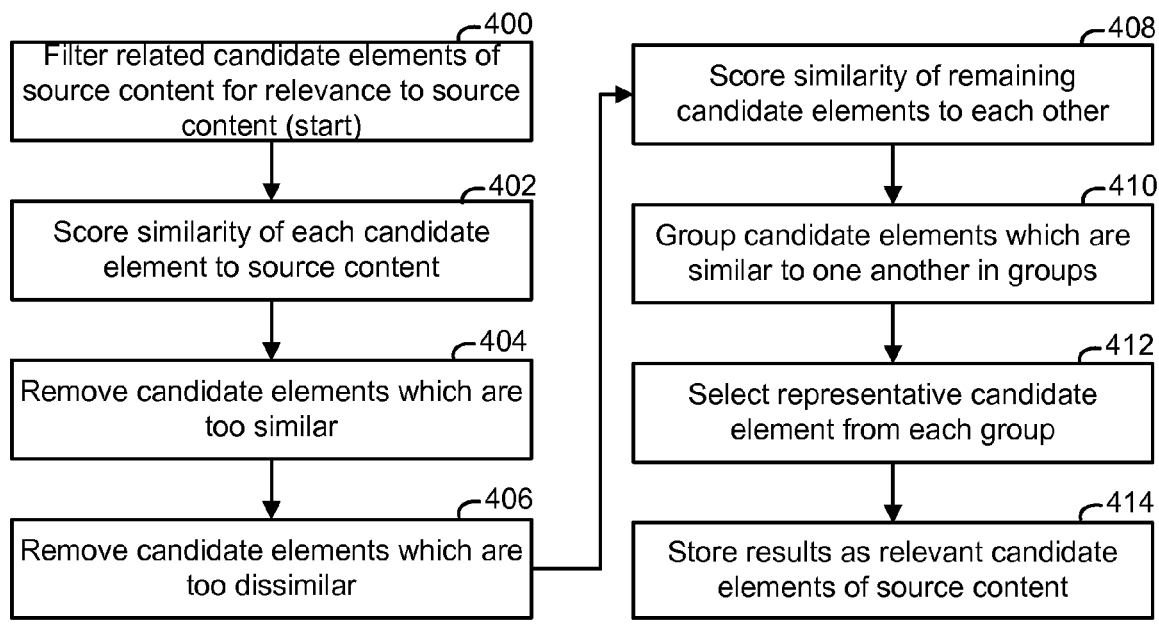
FIG. 4a depicts a process for identifying related candidate elements which are relevant to source content.

FIG. 4a depicts a process for identifying related candidate elements which are relevant to source content. Step 400 includes the start of a process for filtering candidate elements for relevance to the source content. Step 402 includes scoring a similarity of each candidate element to the source content. Step 404 includes removing candidate elements which are too similar to the source content. Step 406 includes removing candidate elements which are too dissimilar from the source content. Step 408 includes scoring a similarity of the remaining candidates to each other, rather than to the source. Similar scoring techniques can be used in either case (steps 402 and 408). Step 410 includes grouping candidate elements which are determined to be similar to one another in a group, such as based on a group-wise similarity threshold, so that there are different groups, and candidate elements in each group are similar to one another. Step 412 includes selecting a representative candidate element from each group. Step 414 includes storing results of the process as relevant candidate elements of the source. These are the results that can be displayed to the user on an auxiliary screen region, for instance.

Figure 4B:
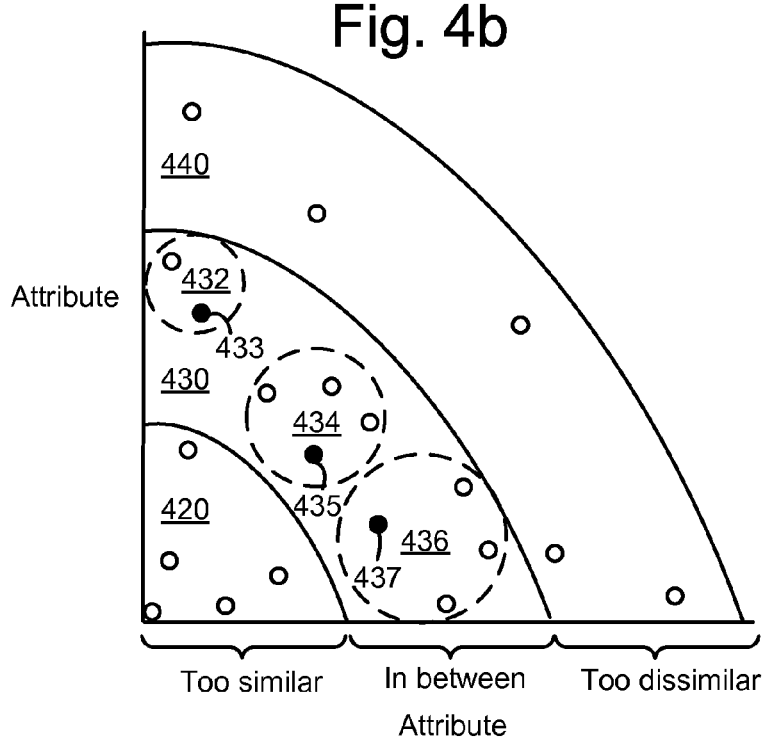
FIG. 4b depicts a results space which shows candidate elements which are too similar, too dissimilar and in between, relative to source content, and groups of candidate elements which are similar to one another.

FIG. 4b depicts a results space which shows candidate elements which are too similar, too dissimilar and in between, relative to source content, and groups of candidate elements which are similar to one another. The x-axis and y-axis represents attributes of candidate elements in a two-dimensional results space. The actual results space can be multi-dimensional.

In one approach, the number of relevant elements which are located should be limited in number and the results should be diverse. Filtering can achieve this. For example, each circle denotes a candidate element, and the candidate elements are distributed in three regions based on their scores. The farther a candidate is from the origin, the less similar it is to the source content. Region 420 denotes a subset of candidate elements that are too similar to the source content and therefore should be filtered out. These candidates are most probably too similar to the source content. Region 440 denotes a subset of candidate elements that are too dissimilar from the source content and therefore should also be filtered out. These candidates are most probably unrelated to the source content. Region 430 denotes a subset of candidate elements that are in between, that is, sufficiently similar but not too similar. These candidate elements are most probably similar, yet not identical to the source content, and therefore should be considered as being relevant.

When selecting the candidates, in an alternative procedure, representative selections should be as relevant as possible to the source page, yet not too similar to one another. The basic algorithm is to divide the candidates into partitions, in a way that each partition's volume is not too large and it includes candidates that are very similar to one another. Two approaches can be taken regarding the volume. In a first approach, volume denotes the diameter of the partition, that is, the maximum similarity distance between all candidate pairs in the partition. In a second approach, volume denotes the average distance between all candidate pairs in the partition. Formally, Let G be a subset of candidates and let G.head denote the candidate in G which is the closest (most relevant) to the source content/page. Given a threshold T, candidate $x \notin G$ is added to a subset of candidates G according to the following criterion: $\max\{\text{volume}(G \cup \{x\}), \text{dist}(x, G.\text{head})\} \leq T$, where dist(x,y) is the similarity distance between candidates x,y.

The graph of FIG. 4b can be obtained as a result of step 402 of FIG. 4a. Removing the candidate elements in region 420 corresponds to step 404 and removing the candidate elements in region 440 corresponds to step 406. Similarity scores and appropriate thresholds can be used to identify the candidate elements that are sufficiently similar but not too similar to the source content.

As discussed in connection with steps 408 and 410, the candidate elements can be scored for similarity to one another and grouped, such as in example groups 432, 434 and 436. To provide users with effective relevant results, it is possible to group together candidate elements that are similar to one another and present the user with only with a representative element such as the most relevant element in each group. This can be performed as a post-filtering step, when the scoring vector, discussed below, is full. In the grouping, the candidate elements are not measured according to their similarity to the source content, but rather according to their similarity (distance) from the other candidate elements. Therefore, a new vector set that reflects a distances matrix between all candidates is calculated. Then, any of various clustering techniques can be performed, such as the standard hierarchical agglomerative, or K-means to more advanced ones and, one representative element from each cluster is chosen. For instance, representative candidate elements 433, 435 and 437 (shown as black circles) from groups 432, 434 and 436, respectively, may be selected.

In order to differentiate between the various candidate elements, a scoring function can be defined. The score reflects the similarity level between two pages or other elements. Since scoring involves several intermediate calculations that are relatively heavy, e.g., computationally intensive, the operations should be as limited as much as possible. Moreover, it is assumed that very bad results can be identified earlier in the process and therefore, may be pruned at earlier stages. Therefore, a filtering process can be implemented in an iterative multi-stage manner as detailed further below.

The distance or similarity between two elements can be composed of several sub-functions, where each estimates the distance according to a different attribute. Example attributes include: Keywords, Category, Title, Description, Domain, Path and Query, each discussed further below. An overall score can be provided which is a weighted summation of these sub-functions. Each sub-function returns a value between 0 and 1, where 0 means identity, e.g., two elements are completely similar and 1 means two elements are completely dissimilar. Moreover, the same scoring procedures can be used for measuring similarities between candidate elements and the source content (step 402) as for measuring similarities between the candidate elements (step 408). These are just examples of attributes and distance functions between them, as various other attributes and distance functions can be used.

Similarity Attribute 1: Keywords

This function helps estimate the content similarity of two web pages or other elements.
Input: Two lists (one for each element), list1 and list2, composed of the keywords and the scores extracted from the elements.
Output: A double between 0-1.
Calculation: As each keyword has a score, representing the importance of the keyword in a given element (if a keyword does not appear in a candidate element, its score is set to 0), the function is based on these scores. Each list undergoes a normalization stage after which the distance is calculated according to the following formula. It should be emphasized that the formulae and numbers appearing hereinafter are only examples, as many variations are possible.

$$Dist = 1 - \frac{\sum_{keywords} \min(score_1, score_2)}{\sum_{keywords} \max(score_1, score_2)}$$

Normalization is used to compute the importance of each keyword relative to the entire keywords list. It can be calculated as follow:
Score Sum=sum of all keywords score.
Normalized score=score/score sum.

Example list1=("a", 0.3), ("b", 0.2) is normalized to list1=("a", 0.6), ("b", 0.4) (because 0.3/0.5=0.6 and 0.2/0.5=0.4); and
list2=("c", 0.6), ("a", 0.1) is normalized to list2=("c", 0.86), ("a", 0.14) (because 0.6/0.7=0.86 and 0.1/0.7=0.14).
The distance is then:

$$Dist = 1 - \frac{0.14 + 0 + 0}{0.6 + 0.4 + 0.86} = 0.925$$

Similarity Attribute 2: Category

The category of an element is extracted by an algorithm such as the k-shortest path (KSP). It is organized in a hierarchical way ($level_1/level_2/\ldots/level_n$). As any element can be associated to more than one category (i.e., there is a non exclusive association), KSP scores the categories of each element.
Input: Two normalized weighted category sets (the normalization stage is identical to the one described in keywords distance).
Output: A double representing the distance between the two sets.
Calculation:
The similarity between two categories is defined as the number of common levels, divided by their average length. The distance is defined as one minus the similarity.
The distance between category x and a set B is defined as follows:

Dist(x,B)=Min category in B(dist(x, category))

The distance between set A to set B is:

Dist(A→B)=$\Sigma_{a\ in\ A}$(score$_a$*Dist(a,B))

The distance between two weighted sets of categories A and B is, therefore:

Dist=Max{Dist(A→B), Dist(B→A)}.

As an example of the category attributes, FIG. 4c depicts scoring of a first element, element A, for different categories and FIG. 4d depicts scoring of a second element, element B, for different categories. For instance, the first element may be the content of a first page having a URL of http://www.cnn.com, and the second element may be the content of a second page having a URL of http://www.newyorktimes.com. A set of all possible categories may be predefined. Five categories and corresponding raw and normalized scores are provided in an order of least similar first and most similar last. Recall that a lower score indicates a greater similarity. Note that FIG. 4d includes three of the categories of FIG. 4c (i.e., Arts_&_Entertainment/Television, Arts_&_Entertainment/Radio and News/Wire_Services) and two additional categories (i.e., Vehicles/Automobiles and News/Newspapers).

FIG. 4e depicts similarity scores between the categories of FIGS. 4c and 4d. Each column provides one of the categories of element A from FIG. 4c, and each row provides one of the categories of element B from FIG. 4d. A score at the intersection of the categories represents the similarity of the categories. For example, the category "Arts_&_Entertainment/Television" for element A has a similarity score of 1 to the category of "Vehicles/Automobiles" for element B, indicating that these two categories are completely dissimilar. The category "Arts_&_Entertainment/Television" for element A has a similarity score of 0 to the same category for element B, indicating that these two categories are identical. The category "Arts_&_Entertainment/Television" for element A has a similarity score of 0.5 to the category of Arts_&_Entertainment/Radio for element B, indicating that these two categories are moderately similar.

The distance between category x and a set B, for element B, is defined as follows.
For the category "Arts_&_Entertainment/Television" (column 1 of FIG. 4e):

Dist(x,B)=Min category in B(dist(x, category))=min(1, 1,0,0.5,1,0)=0.

For the category "Arts_&_Entertainment/Radio" (column 2 of FIG. 4e):

Dist(x,B)=Min category in B(dist(x, category))=min(1, 1,0.5,0,1,0)=0.

For the category "Society_&_Culture/Activism_&_Social_Issues" (column 3 of FIG. 4e):

Dist(x,B)=Min category in B(dist(x, category))=min(1, 1,1,1,1,1)=1.

For the category "News/Wire_Services" (column 4 of FIG. 4e):

Dist(x,B)=Min category in B(dist(x, category))=min(1, 0,1,1,0.5,0)=0.

For the category "Society_&_Culture/Politics" (column 5 of FIG. 4e):

Dist(x,B)=Min category in B(dist(x, category))=min(1, 1,1,1,1,1)=1.

Similar calculations provide the distance results in the last column for the distance between category x and set A, for element A.

The distance from set A to set B can be found from:
Dist(A→B)=$\Sigma_{a\ in\ A}$(score$_a$*Dist(a,B))=0.235*0+0.207*0+ 0.198*1+0.180*0+0.179*1=0.377 (using the normalized scores of FIG. 4c and the distance scores in the last row of FIG. 4e). Similarly, Dist(B→A)=0.210*1+0.206*0+

0.197*0+0.196*0+0.191*0.5=0.306 (using the normalized scores of FIG. 4d and the distance scores in the last column of FIG. 4e). Finally, the distance between two weighted sets of categories A and B is: Dist=Max{Dist(A→B), Dist(B→A)}=max{0.377,0.306}=0.377.

Similarity Attribute 3: Title
Input: Two title strings.
Output: The distance between the titles.
Calculation: After eliminating stop words, e.g., words which are not important such as "the," "a' and "an," the distance is calculated as follows:

$$Dist = 1 - \frac{|\text{intersection}|}{|\text{union}|}$$

Example

Title 1="CNN.com International—Breaking, World, Business, Sports, Entertainment and Video News."
Title 2="The New York Times—Breaking News, World News & Multimedia."
Intersection={Breaking, News, World};
Union={CNN.com, International, Breaking, World, business, sports, Entertainment, Video, News, Multimedia, New York, Times}

Dist=1−3/12=0.75.

Similarity Attribute 4: Description
Input: Two description strings (search provides a description for each element). A description string for a web page, for instance, can be an HTML meta tag which provides a textual description of the web page which is displayed as the first line of a search result. For the web page www.cnn.com, the description is "CNN.com—Breaking News, U.S., World, Weather, Entertainment . . . "
Output: The distance between the description strings.
Calculation: After eliminating stop words, the distance is calculated as follows:

$$Dist = 1 - \frac{|\text{intersection}|}{|\text{union}|}$$

Similarity Attribute 5: Domain
Input: Two host or domain strings. An example domain name is "tennis.sportstelevision.com."
Output: The distance between the domain strings.
Calculation: Extract the host name of the two domains such as from URLs. If equal, return 0, indicating complete similarity. If their prefix up to the first dot in the domain name is different, but the rest is equal, return 0.1, indicating a close similarity. For example, the domain names "tennis.sportstelevision.com" and "golf.sportstelevision.com" meet this criteria. Otherwise, return 1, indicating complete dissimilarity.

Similarity Attribute 6: Path
Input: Two path strings of two elements (from the same or different domains).
Output: The distance between the paths.
Calculation: Extract the paths and return:

$$Dist = 1 - \frac{\text{length(common path)}}{\text{Average(length1, length2)}}.$$

Example

Domain 1="http://edition.cnn.com/2008/CRIME/04/20/polygamy.sect/index.html"
Domain2="http://edition.cnn.com/2008/WORLD/asiapcf/04/21/indonesia.militant/index.html"

$$Dist = 1 - \frac{2}{5.5} = 0.636.$$

The common path is "edition.cnn.com/2008" which has two components, "edition.cnn.com" and "2008." Length1 is the number of components in a remainder of the URL. For "CRIME/04/20/polygamy.sect/index.html," the length (length1) is five components. For "WORLD/asiapcf/04/21/indonesia.militant/index.html," the length (length2) is six components. The average of 5 and 6 is 5.5.

Similarity Attribute 7: Query
Input: Two query strings. A query string is the part of a URL that follows "?" and contains data to be passed to an application. A typical URL containing a query string is as follows: http://server/path/program?query_string.
Output: The distance between the queries, which can be determined in a similar manner as with the example above for "Path."
Calculation: Extract the queries of the two URLs. If equal, return 0; otherwise, return 1.

The above discussion of FIGS. 4a-4e related to techniques for scoring candidate elements in a filtering process to find relevant elements of source content. A further discussion regarding filtering follows.

Figures 5A, 5B:
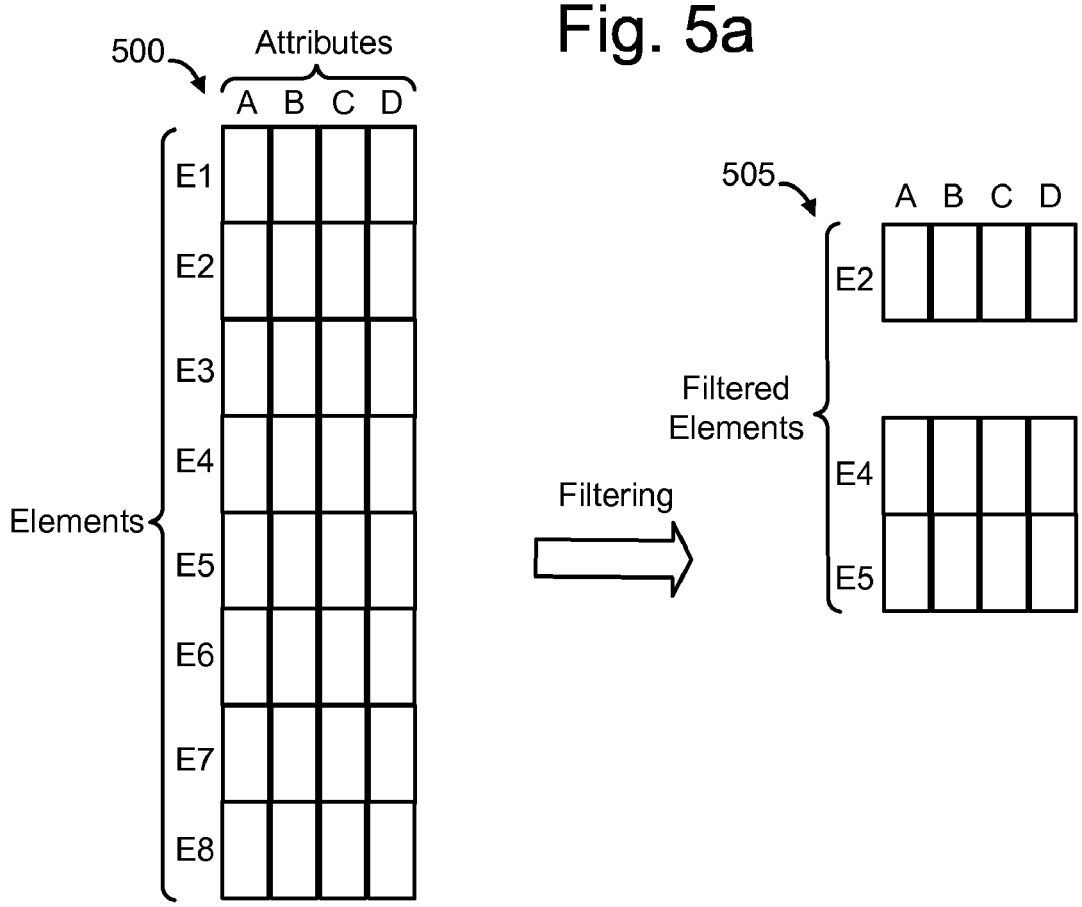
FIG. 5a depicts one-stage filtering of candidate elements.
FIG. 5b depicts priorities assigned to filter stages and attributes.

FIG. 5a depicts one-stage filtering of candidate elements based on their attributes. As the number of displayed relevance results is limited, there is a need to select the relevant elements among the many candidates. Filtering is a process in which a subset of candidate elements is selected (filtered in) while the rest are unselected (filtered out). The selection is based on a calculation that measures each element according to certain criteria. Elements that meet the criterion are selected. Usually elements are described by a vector of attributes where each attribute is a measurement of a different property in the data (e.g., weight, height, age). One filtering procedure scores each element (where the score is a function of the attributes) and checks whether that score meets a certain criterion, which is usually a threshold. A more complex filtering method also considers the interrelations between elements while measuring the criteria.

As displayed in FIG. 5a, one-stage filtering chooses elements according to a complete set of information which has been gathered for each attribute of each element. For example, in the data set 500, the candidate elements are represented by E1 through E8 and example attributes are represented by A, B, C and D. In this approach, one filtering stage is performed based on attributes A, B, C and D to determine that elements E2, E4 and E5 should be filtered in and the other elements should be filtered out, as depicted by the data set 505. Such a strategy can be inefficient as it may be expensive and redundant. It may be expensive because elements are described as a vector of features (also known as feature-space), and collecting all features is an expensive operation (either in performance, calculation or the actual data gathering). Further, one-stage filtering can be redundant when it can be concluded from one attribute or fewer than all attributes that an element is either very good and should be filtered in, or very bad and should be filtered out (according to the filtering criterion). In such cases, the element is nevertheless subjected to exhaustive calculations with all attributes.

A more efficient, multi-stage filtering approach is discussed next. In this approach, each attribute is assigned a priority, which is a factor of its cost (e.g., how 'expensive' it is to calculate the value of the attribute for all elements) and its merit (how meaningful the attribute is to the selection process). As an example, with the attributes of Keywords, Category, Title, Description, Domain, Path and Query, it may be determined, e.g., that the Title is more meaningful than the Query and therefore should have a higher priority.

FIG. 5b depicts priorities assigned to filter stages and attributes, including example filter stages/attribute priorities 1, 2, 3 and 4 and attributes A, B, C and D, respectively.

Figure 5C:
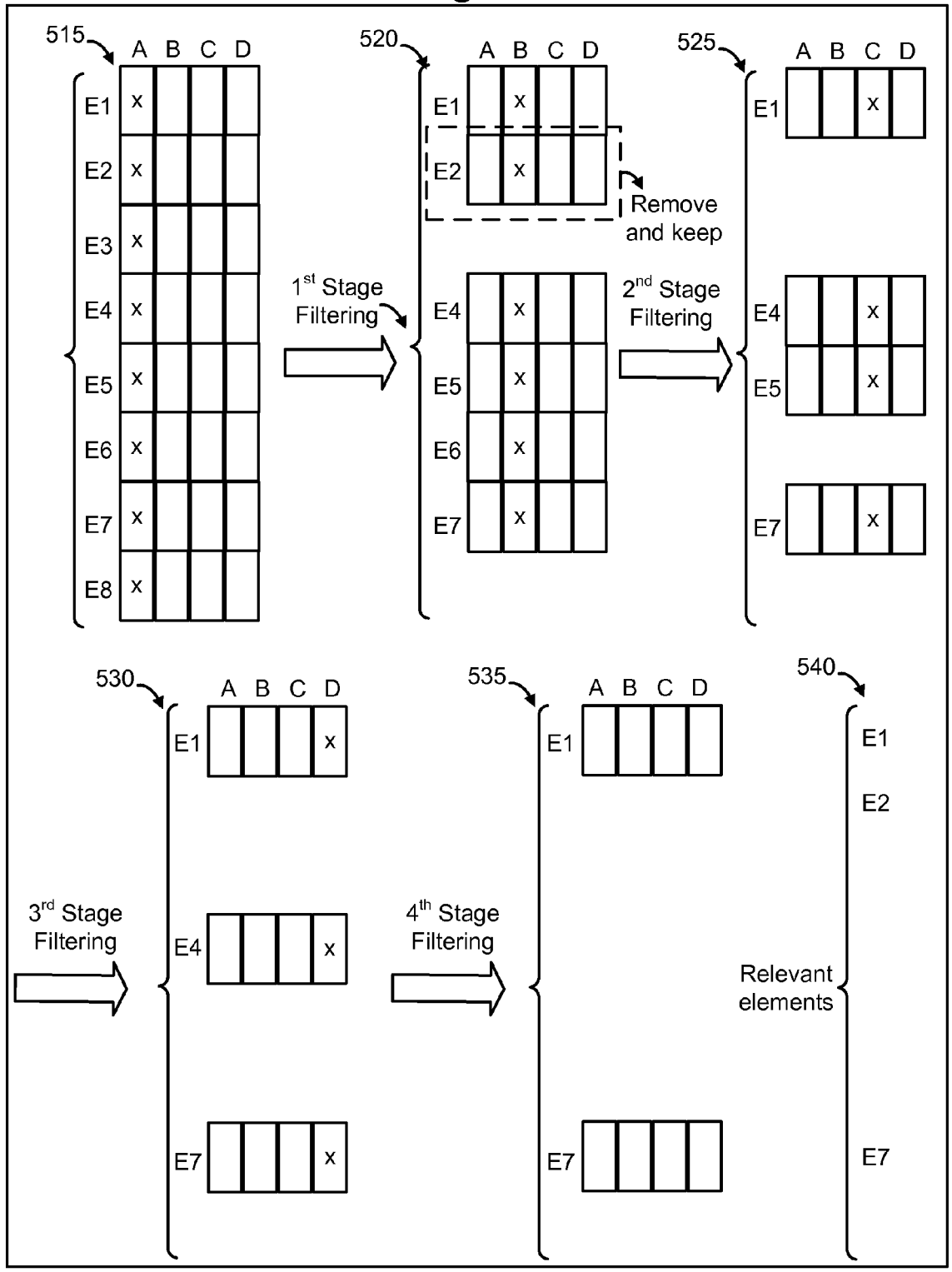
FIG. 5c depicts multi-stage filtering of candidate elements based on different attributes in different stages.

FIG. 5c depicts multi-stage filtering of candidate elements based on different attributes in different stages. Generally, multiple-filtering stages can be used, where each stage filters using one or more attributes. In this example, each stage uses one attribute. In data set 515, the "x" notation indicates that a first stage of filtering involves only Attribute A. After the first stage, data set 520 indicates that elements E1, E2 and E4-E7 remain. These elements have thus been filtered in or kept after the first stage. Of the elements which are kept, some can be filtered further in the next stage and some can be removed from further filtering if they meet certain criteria. For example, if Attribute A is the Title of a candidate element, and the similarity score for that attribute passes a threshold which indicates the element is sufficiently relevant, it can be decided that the element is relevant and no further filtering of the element is necessary. For example, data set 520 shows E2 being removed from further filtering and kept.

Second stage filtering is based on Attribute B and results in the data set 525, which includes E1, E4, E5 and E7. E6 is filtered out. Third stage filtering is based on Attribute C and results in the data set 530, which includes E1, E4 and E7. E5 is filtered out. Fourth stage filtering is based on Attribute D and results in the data set 535, which includes E1 and E7. E4 is filtered out. E2, which was removed after the first stage filtering, is added back with E1 and E7 to form a set 540 of relevant elements: E1, E2 and E7.

The filtering is thus broken into stages, and each attribute is associated to a stage according to its priority (in a decreasing order). In each stage, only the associated one or more attributes are measured and the elements are scored based on these one or more attributes. Sometimes, even in the early stages, an element can meet a criterion which allows it to be filtered in so that no further filtering of the element is performed. An element can also be filtered out at the early stages so that it is no longer considered. A decision on the other elements is not made, so more information regarding other attributes must be collected for the next stage. Specifically, after the first stage, no decision is made for E1 and E4-E7. After the second stage, no decision is made for E1, E4, E5 and E7. After the third stage, no decision is made for E1, E4 and E7. After the fourth stage, E1 and E7 are filtered in as it is the last stage, in this example.

Advantageously, once a decision is made to keep or discard an element, there is no need to collect further information for it. This can save substantial processing resources, without changing the filtering results. Calculations are performed only as needed for each stage, in a calculation on demand approach.

Figure 5D:
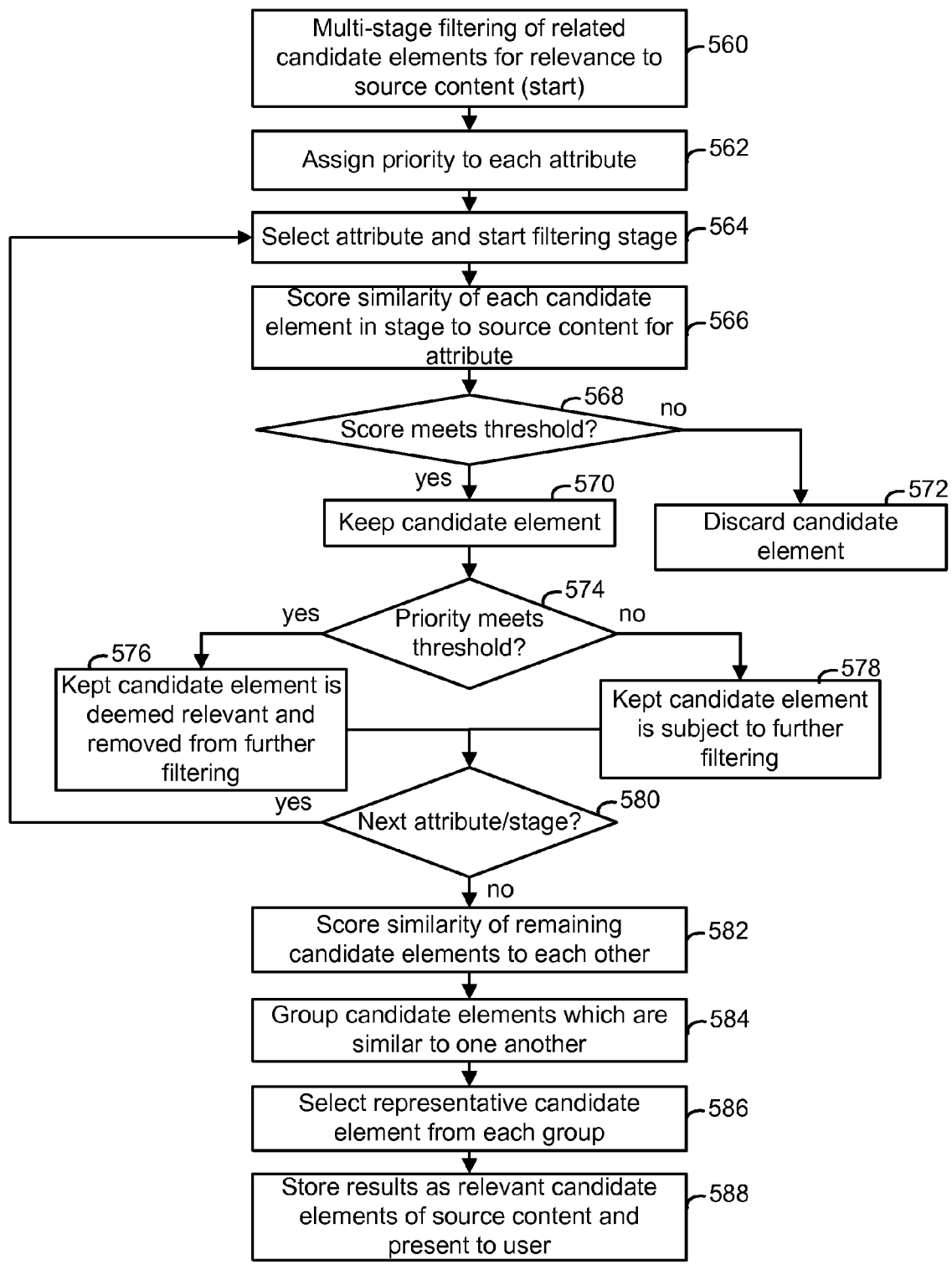
FIG. 5d depicts a process for multi-stage filtering of candidate elements.

FIG. 5d depicts a process for multi-stage filtering of candidate elements based on different attributes in different stages. Step 560 denotes the start of multi-stage filtering of related candidate elements of source content to determine relevance to the source content. Step 562 includes assigning a priority to each attribute. Step 564 includes selecting an attribute and starting a filtering stage, e.g., selecting attributes A, B, C and D for stages 1, 2, 3 and 4, respectively. Step 566 includes scoring a similarity of each candidate element in the current stage to the source content for the current attribute. At decision step 568, if the score meets an associated threshold indicating the element is sufficiently relevant, the element is kept at step 570. That is, the element is not discarded. Recall that, depending on the scoring technique used, a low score can indicate a high relevance. Meeting the threshold at decision step 568 generally indicates the element is very relevant. At decision step 568, if the score does not pass the threshold indicating the element is sufficiently relevant, the element is discarded at step 572.

At decision step 574, if the current priority exceeds meets an associated threshold, the kept candidate element is deemed relevant and removed from further filtering (step 576). For example, in FIG. 5c, stage 1 involved filtering based on attribute A, which had a priority of 1, the highest priority, from FIG. 5b. As an example, if a priority threshold is set to 1, an element can be deemed relevant and removed from further filtering only the first stage but not later stages. As another example, if the priority threshold is set to 2, an element can be deemed relevant and removed from further filtering at the first or second stages, but not later stages. At decision step 574, if the current priority does not meet the threshold, the kept candidate element is subject to further filtering (step 578). Filtering for the stage is completed at this point. At decision step 580, if there is a next attribute/stage of the filtering process, processing proceeds at step 564 with selection of the next attribute and starting the associated filtering stage.

At decision step 580, if there is no next attribute/stage of the filtering process, a process begins to group similar candidate elements, as discussed in connection with FIG. 4b. Specifically, step 582 includes scoring a similarity of the remaining candidate elements, which have been found to be relevant by the filtering, to each other. Step 584 includes grouping candidate elements which are similar to one another. Step 586 includes selecting a representative candidate element from each group. Step 588 includes storing the results as relevant candidate elements of the source content and presenting the elements to the user such as via a user interface.

Figure 6:
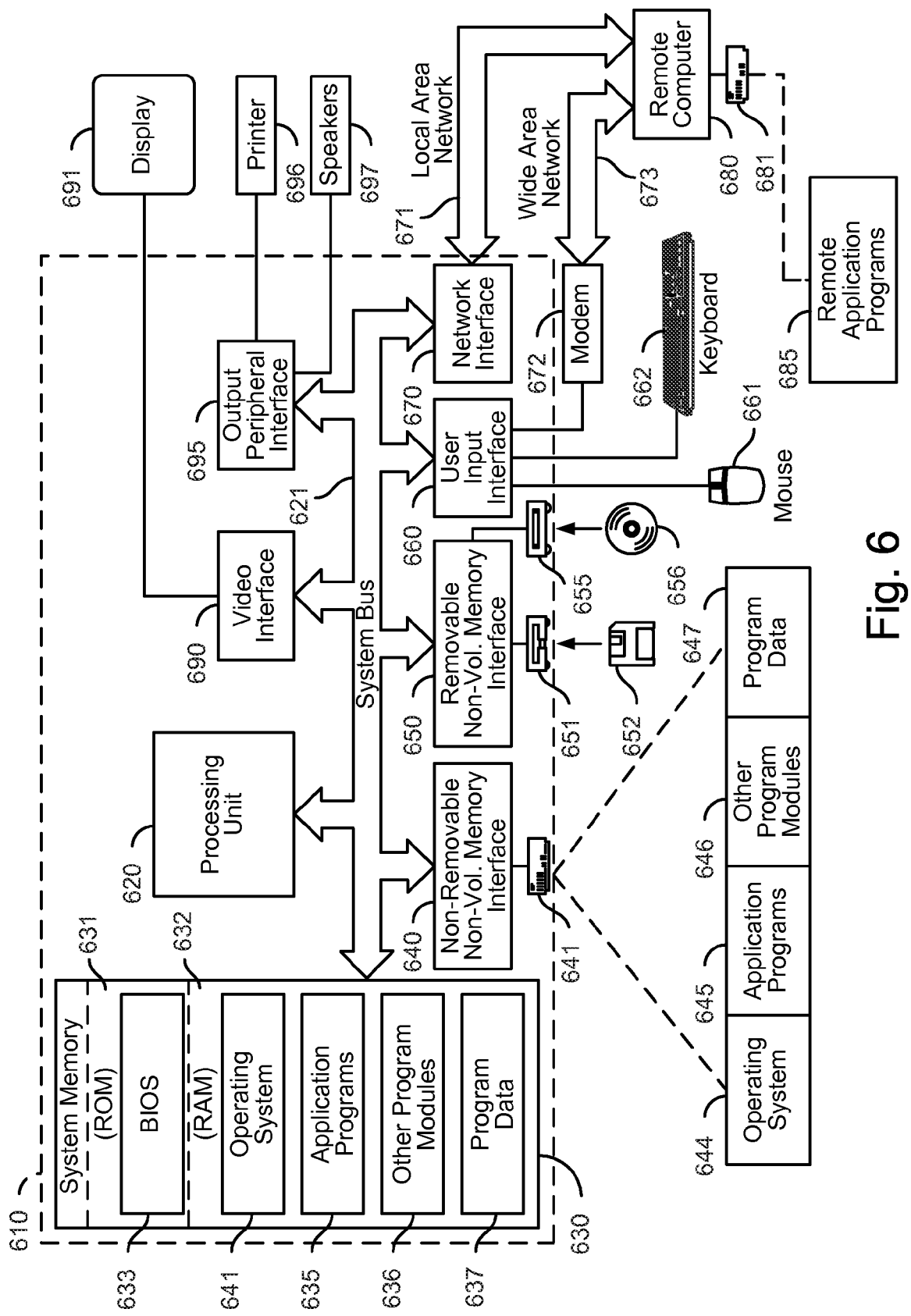
FIG. 6 is a block diagram of computer hardware suitable for implementing embodiments of the invention.

FIG. 6 is a block diagram of computer hardware suitable for implementing embodiments of the invention. An exemplary system for implementing the invention includes a general purpose computing device in the form of a computer 610. The computer 610 may represent a server which provides a user interface, estimate contest, prediction market, and/or scoring rules, for instance. Components of computer 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 610 typically includes a variety of computer readable media. Computer readable media can be any available media that can be accessed by computer 610 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 610. By way of example, and not limitation, communication media includes wired media such as a wired network or direct-wired connection, and wireless media such as acoustic, RF, infrared and other wireless media. Combinations of any of the above are also included within the scope of computer readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, application programs 635, other program modules 636, and program data 637.

The computer 610 may also include other removable/non-removable, volatile/nonvolatile computer storage media. By way of example only, FIG. 6 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media discussed above and illustrated in FIG. 6, provide storage of computer readable instructions, data structures, program modules and other data for the computer 610. For example, hard disk drive 641 is illustrated as storing operating system 644, application programs 645, other program modules 646, and program data 647. These components can either be the same as or different from operating system 634, application programs 635, other program modules 636, and program data 637. Operating system 644, application programs 645, other program modules 646, and program data 647 are given different numbers here to illustrate that, at a minimum, they are different copies. A user may enter commands and information into the computer 610 through input devices such as a keyboard 662 and pointing device 661, commonly referred to as a mouse, trackball or touch pad. Other input devices (not shown) may include a microphone, joystick, game pad, satellite dish, scanner, or the like. These and other input devices are often connected to the processing unit 620 through a user input interface 660 that is coupled to the system bus, but may be connected by other interface and bus structures, such as a parallel port, game port or a universal serial bus (USB). A monitor 691 or other type of display device is also connected to the system bus 621 via an interface, such as a video interface 690. In addition to the monitor, computers may also include other peripheral output devices such as speakers 697 and printer 696, which may be connected through an output peripheral interface 695.

The computer 610 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 610, although only a memory storage device 681 has been illustrated. The logical connections depicted include a local area network (LAN) 671 and a wide area network (WAN) 673, but may also include other networks. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the user input interface 660, or other appropriate mechanism. In a networked environment, program modules depicted relative to the computer 610, or portions thereof, may be stored in the remote memory storage device. By way of example, and not limitation, FIG. 6 illustrates remote application programs 685 as residing on memory device 681. It will be appreciated that the network connections shown are exemplary and other means of establishing a communications link between the computers may be used.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

We claim:

1. A computer-implemented method for providing content to a user via a user interface, comprising:
analyzing content which is displayed on the user interface;
based on the analyzing, identifying a set of candidates elements which are related to the content, the identifying comprises performing a search by providing multiple search calls to a search engine, the multiple search calls include an original call, and variations to the original call which expand a diversity of the set of candidate elements;
determining a first set of scores which represent similarities between the content and each of the candidate elements of the set;
based on the first set of scores and appropriate thresholds, identifying a subset of candidate elements of the set which are sufficiently similar, but not too similar, to the content, and removing candidate elements of the set which are too similar to the content;

determining a second set of scores which represent similarities between the candidate elements of the subset;

grouping the candidate elements of the subset in groups based on the second set of scores and a group-wise similarity threshold, the candidate elements in each group are determined to be similar to one another based on the second set of scores and the group-wise similarity threshold;

selecting a representative candidate element from each group; and displaying representations of the representative candidate elements on the user interface.

2. The computer-implemented method of claim 1, wherein:
the representations of the representative candidate elements are displayed on the user interface concurrently with a representation of the content.

3. The computer-implemented method of claim 1, wherein:
the analyzing the content comprises at least one of: (a) extracting a location directly from the content and (b) extracting an address from a cue in the content; and
the set of candidate elements is identified based on at least one of the extracted location and the extracted address.

4. The computer-implemented method of claim 1, wherein:
the analyzing the content comprises determining a reference to a person named in the content; and
the set of candidate elements is identified based on the reference to the person.

5. The computer-implemented method of claim 1, wherein:
the content comprises keywords; and
the variations to the original call are formulated by manipulating the keywords to expand the diversity of the set of candidate elements.

6. The computer-implemented method of claim 1, wherein:
priorities are assigned to attributes of the content; and
the identifying the subset of candidate elements comprises filtering the candidate elements of the set in a sequence of stages according to the priorities, each stage corresponding to at least one of the attributes and its assigned priority, so that the stages are ordered in a descending order of priority.

7. The computer-implemented method of claim 6, wherein:
based on the first set of scores, the filtering identifies at least one of the candidate elements of the second set as being sufficiently similar, but not too similar, to the content before a last stage in the sequence of stages, in response to which the at least one of the candidate elements is no longer subject to the filtering.

8. The computer-implemented method of claim 6, wherein:
based on the first set of scores, the filtering identifies at least one of the candidate elements of the second set as being sufficiently dissimilar to the content before a last stage in the sequence of stages, in response to which the at least one of the candidate elements is no longer subject to the filtering.

9. The computer-implemented method of claim 6, wherein:
the filtering comprises gathering information of the candidate elements of the second set which is needed for each stage to score a similarity of the candidate elements of the second set to the content based on the associated attribute of the stage, the information is gathered on an as needed basis before each stage so that information is gathered for candidate elements of the second set which have not been filtered out in an earlier stage, and information is not gathered for candidate elements of the second set which have been filtered out in an earlier stage.

10. The computer-implemented method of claim 1, wherein:
the search calls comprise queries which are formulated by manipulating keywords of the content.

11. The computer-implemented method of claim 1, wherein:
the content comprises a web page; and
the identifying the set of candidates elements includes determining, and feeding to the search engine, keywords that a group of users use to find the web page.

12. The computer-implemented method of claim 1, wherein:
the identifying the set of candidates elements includes tracking a navigation of users who have visited the content, including determining at least one of a previous element visited before the content and a next element visited after the content.

13. The computer-implemented method of claim 1, wherein:
the identifying the set of candidates elements includes determining elements which share at least one of incoming links and outgoing links.

14. The computer-implemented method of claim 1, wherein:
the identifying the set of candidates elements includes ranking elements based on a number of links from the elements to the content.

15. The computer-implemented method of claim 1, wherein:
the content comprises a web page and the set of candidates elements includes pages; and
the identifying the set of candidates elements includes providing a directed graph in which nodes are the pages and edges are links connecting the pages, and determining whether paths between the pages are significant based on a preference for a direct path between pages, and a preference for a two way path between pages.

16. The computer-implemented method of claim 1, wherein:
the identifying the set of candidates elements includes determining a behavior of a group of users in regard to the content, and determining a connectivity between potential candidate elements.

17. A computer readable storage device having computer readable software embodied thereon for programming at least one processor to perform a method for providing content to a user via a user interface, the method comprising:

analyzing content which is displayed on the user interface;

based on the analyzing, identifying a set of candidates elements which are related to the content, the identifying comprises performing a search by providing multiple search calls to a search engine, the multiple search calls include an original call, and variations to the original call which expand a diversity of the set of candidate elements;

determining a first set of scores which represent similarities between the content and each of the candidate elements of the set;

based on the first set of scores and appropriate thresholds, identifying a subset of candidate elements of the set which are sufficiently similar, but not too similar, to the content, and removing candidate elements of the set which are too similar to the content;

determining a second set of scores which represent similarities between the candidate elements of the subset;

grouping the candidate elements of the subset in groups based on the second set of scores and a group-wise similarity threshold, the candidate elements in each group are determined to be similar to one another based on the second set of scores and the group-wise similarity threshold;

selecting a representative candidate element from each group; and displaying representations of the representative candidate elements on the user interface.

* * * * *